US012154401B1

(12) United States Patent
Gourlay et al.

(10) Patent No.: US 12,154,401 B1
(45) Date of Patent: Nov. 26, 2024

(54) SYSTEMS AND METHODS TO AUTOMATE ENTRY/EXIT OPERATIONS AT FACILITIES

(71) Applicant: Amazon Technologies, Inc., Seattle, WA (US)

(72) Inventors: Derek Gourlay, Port Coquitlam (CA); Rahul Mahindru, Burnaby (CA); Laurie Howard, New Berlin, WI (US); Cumhur Erkan Tuncali, Redmond, WA (US); Ilya Krokus, Vancouver (CA); Sidhartha Shankar Thapar, Surrey (CA); Maria Fernanda Rivas Morales, Plano, TX (US); Manish Jyoti, Edmonds, WA (US); Manjunath Subburathinam, Lakeway, TX (US); Graham Kuzia, Woodstock, GA (US); Richard James Bubb, Nasvhille, TN (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 18/066,792

(22) Filed: Dec. 15, 2022

(51) Int. Cl.
*G07C 9/10* (2020.01)

(52) U.S. Cl.
CPC .................................... *G07C 9/10* (2020.01)

(58) Field of Classification Search
CPC .. G07C 9/10; G07C 9/00182; G07C 9/00309; G07C 9/00857; G07C 9/22; G07C 9/32; G07C 2009/00269
See application file for complete search history.

(56) References Cited

U.S. PATENT DOCUMENTS

| | | | | |
|---|---|---|---|---|
| 8,243,140 B1 * | 8/2012 | Howe | G08G 1/0175 348/149 |
| 10,482,421 B1 * | 11/2019 | Ducrou | G06V 20/54 |
| 2011/0128381 A1 * | 6/2011 | Bianco | G07B 15/02 348/149 |
| 2017/0372161 A1 * | 12/2017 | Almeida | G06F 18/256 |

* cited by examiner

*Primary Examiner* — Omer S Khan
(74) *Attorney, Agent, or Firm* — Athorus, PLLC

(57) ABSTRACT

Automated gate entry/exit authorization systems and methods may comprise various sensor systems to detect a vehicle proximate a gate of a facility. Various detected data of the vehicle may be consolidated into a gate sensor event, and the gate sensor event may be compared with pre-registration information to determine whether the vehicle is scheduled to depart or arrive via the gate. If the gate sensor event corresponds with a scheduled appointment, further instructions may be provided to the vehicle related to the facility or yard, and the gate may be automatically opened to provide access. Alternatively, if the gate sensor event does not correspond with a scheduled appointment, further information or instructions, such as corrective or remedial actions, may be provided to the vehicle, and access via the gate may be automatically denied.

18 Claims, 9 Drawing Sheets

SYSTEMS AND METHODS TO AUTOMATE ENTRY/EXIT OPERATIONS AT FACILITIES

BACKGROUND

Many companies may store, package, and ship items and/or groups of items between material handling facilities. For example, many companies may store items in a material handling facility and ship items to various destinations (e.g., customers, stores, other facilities) from the material handling facility. Various material handling systems and processes, including loading, transport, receipt, unloading, storage, or other processing of items, often incur significant cost and time. Accordingly, there is a need for automated systems and methods to facilitate the various material handling processes between material handling facilities or other destinations, thereby improving the speed and efficiency of such processes.

DETAILED DESCRIPTION

Figure 1:
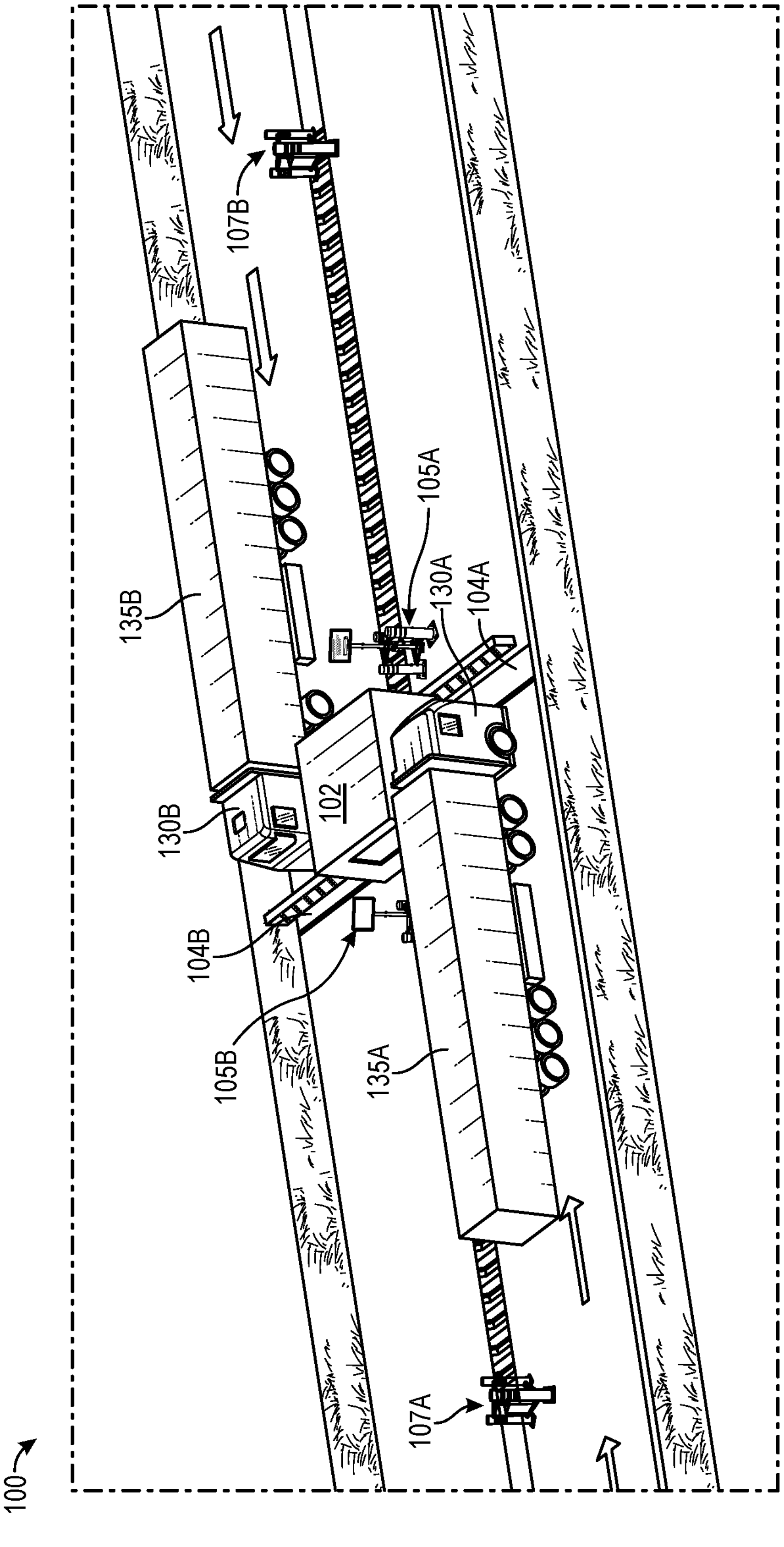
FIG. 1 is a schematic diagram of an example entry/exit gate associated with a facility, in accordance with implementations of the present disclosure.

As is set forth in greater detail below, implementations of the present disclosure are directed to systems and methods to automate entry and exit operations at various facilities, in order to improve the speed and efficiency associated with various material handling processes between and at material handling facilities.

In example embodiments, entry and/or exit gates associated with facilities may include various types of sensors to detect arrival or departure of various types of vehicles. For example, the entry and/or exit gates may include a guard shack, e.g., for use by human agents or associates, one or more gates, control systems, communication systems, forward sensor systems, rearward sensor systems, presence sensor systems, radiofrequency identification (RFID) readers or systems, and/or other types of sensors or systems.

In example embodiments, the presence sensor systems may comprise global positioning system (GPS) receivers, motion sensors, presence detection sensors, or other types of sensors. The GPS receivers may receive or detect location data of GPS devices that may be onboard or associated with vehicles traveling between material handling facilities. In addition, the motion sensors or presence detection sensors may detect presence of vehicles that are proximate the gates of facilities.

In additional example embodiments, the forward sensor systems may comprise imaging devices or sensors, such as cameras, video cameras, or other types of imaging sensors. The imaging devices or sensors may detect or capture imaging data of portions of vehicles that are proximate the gates. For example, the imaging devices or sensors may detect or capture identifiers associated with vehicles, such as front license plates, commercial vehicle identification numbers, or other identifying information.

In further example embodiments, the rearward sensor systems may also comprise imaging devices or sensors, such as cameras, video cameras, or other types of imaging sensors, as well as RFID readers or systems. The imaging devices or sensors may detect or capture imaging data of portions of vehicles that are proximate the gates. For example, the imaging devices or sensors may detect or capture identifiers associated with vehicles, such as rear license plates, commercial vehicle identification numbers, or other identifying information. In addition, the RFID readers or systems may receive and detect data associated with RFID tags, e.g., identifiers or status, that are onboard or associated with vehicles proximate the gates. The RFID tags may be associated with locks, latches, or other closures that secure one or more doors, swing doors, ramp doors, trailer doors, or other doors associated with the vehicles.

In example embodiments, the communication systems may comprise various displays, screens, monitors, cameras, microphones, speakers, or other visual and/or audio input/output devices. Various information or instructions may be provided to vehicles proximate the gates, e.g., to drivers of the vehicles, including information or instructions related to granting or denying access, parking locations, dock doors, travel information or directions, basic rules or guidance related to facility or yard operations, and/or other types of information. Further, the communication systems may be positioned, associated, or integrated with one or more of the sensor systems proximate the gates, and together with one or more sensor systems, may form interactive sensor kiosks proximate the gates. Alternatively or in addition, the communication systems may include mobile, handheld, or portable computing devices, such as computers, laptops, mobile phones, or other types of electronic devices, via which various information or instructions may be provided to drivers of the vehicles, as well as to facility control systems or personnel.

Based on the various data received, detected, or captured with respect to vehicles proximate the gates, gate sensor events may be generated or determined for which entry and/or exit via the gates may be authorized or denied. The various data of gate sensor events may be compared with pre-registration information associated with vehicles to determine whether to allow or deny access via the gates. For example, the pre-registration information may include appointments data comprising vehicle identification information, carrier information, payload information, origin information, destination information, departure time information, arrival time information, and/or other types of information.

Responsive to determining that access via the gates should be granted for specific gate sensor events associated with vehicles, various information or instructions may be provided to the vehicles, and the gates may be operated or actuated to open and allow access. In examples related to allowing entry of vehicles via the gates to yards associated with facilities, information related to selected yard locations for the vehicles may be communicated to the vehicles, as well as various other information or instructions. In examples related to denying access to vehicles via the gates, information related to corrective or remedial actions or tasks may be communicated to the vehicles, as well as various other information or instructions. Further, the gates may comprise wireless actuation devices that may enable automated actuation or operation of the gates based on the determinations related to gate sensor events of vehicles proximate the gates.

By receiving, detecting, and capturing various data of gate sensor events for vehicles proximate gates of facilities using various types of sensors, and by comparing the gate sensor events with pre-registration information related to the vehicles, access authorization determinations may be substantially automatically generated to facilitate safer, faster, and more efficient operations of facilities and associated gates and yards. Further, the various data captured by the various types of sensors, including imaging data, motion or presence data, GPS data, RFID data, or other data, may ensure greater accuracy in generation of access authorization determinations, as well as improved reliability with respect to chain of custody of items, packages, or other payload transferred between facilities. Moreover, by communicating information or instructions to drivers of vehicles and/or facility control systems and personnel via various communication systems, and by integrating automated actuation or operation of gates or boom arms that control access to such facilities, operations of facilities and associated gates and yards may be substantially automated for greater speed and efficiency for both drivers and facilities.

FIG. 1 is a schematic diagram 100 of an example entry/exit gate associated with a facility, in accordance with implementations of the present disclosure.

As shown in FIG. 1, an entry and/or exit access way, gateway, or checkpoint may comprise a guard shack 102, one or more entry gates 104A, one or more exit gates 104B, forward sensor systems 105, rearward sensor systems 107, and/or other sensor systems described herein.

For example, the entry and/or exit checkpoint may comprise one or more roadways that may be used for entering and/or exiting an area proximate a facility, e.g., a yard of the facility. Generally, access to the yard of the facility may be restricted or controlled, and one or more fences or other barriers may be positioned around the yard of the facility to maintain access control via one or more entry and/or exit checkpoints.

In example embodiments, the guard shack 102 may comprise a building or other structure to facilitate access control operations. Conventionally, one or more human agents or associates may be present within the guard shack

102 to manually control access into and out of the facility. However, in some example embodiments of automated entry/exit systems described herein, a guard shack 102 may not be present at entry and/or exit checkpoints. In addition, the entry and exit gates 104A, 104B may comprise movable barriers to selectively allow or deny access into or out of the facility. As schematically illustrated in FIG. 1, the one or more gates 104 may include fences, gates, doors, boom arms, pylons, bollards, spikes, or other movable, extendible, retractable, closeable, and/or openable barriers to control access.

In example embodiments, the forward sensor systems 105A, 105B may comprise one or more imaging devices or sensors that may be aimed or oriented to capture imaging data of a forward or front portion of a vehicle proximate the gates 104, e.g., a vehicle that is requesting access via a gate. For example, the forward sensor systems 105A, 105B may detect or capture imaging data of an identifier of the vehicle, such as a front license plate, a commercial vehicle identification number (e.g., U.S. Department of Transportation (USDOT) number), or other identifiers. In addition, the forward sensor systems 105 may also include at least a portion of a communication system, such as a screen, monitor, display, camera, microphone, speakers, or other visual and/or audio input/output devices. Various information or instructions may be provided to the vehicles, e.g., drivers of vehicles, via the communication system. Further details of the forward sensor systems 105 are described herein at least with respect to FIG. 2.

In addition, the rearward sensor systems 107A, 107B may comprise one or more imaging devices or sensors that may be aimed or oriented to capture imaging data of a rearward or back portion of a vehicle proximate the gates 104, e.g., a vehicle that is requesting access via a gate. For example, the rearward sensor systems 107A, 107B may detect or capture imaging data of an identifier of the vehicle, such as a rear license plate, a commercial vehicle identification number (e.g., U.S. Department of Transportation (USDOT) number), or other identifiers. In addition, the rearward sensor systems 107 may also include radiofrequency identification (RFID) readers or sensors that may detect or sense RFID tags associated with vehicles. The RFID tags may be coupled or attached to locks, latches, or other closures that secure doors of vehicles. Further details of the rearward sensor systems 107 are described herein at least with respect to FIGS. 4 and 5.

In example embodiments, additional sensor systems may be included or provided as part of the forward or rearward sensor systems 105, 107, and/or may be provided as additional sensor systems proximate the gates 104, potentially in communication with the forward or rearward sensor systems 105, 107. For example, global positioning system (GPS) receivers may be included or provided as part of various sensor systems proximate the gates 104, and the GPS receivers may receive or detect location information from GPS devices that are onboard or associated with vehicles traveling from, between, or to various facilities. In addition, various motion sensors or presence detection sensors may be included or provided as part of various sensor systems proximate the gates 104, and the motion or presence sensors may detect presence of vehicles proximate the gates, as well as determine duration of presence of vehicles at the gates. Further details of the additional sensor systems are described herein at least with respect to FIG. 3A. Moreover, at least a portion of the communication system may be included or provided as part of various sensor systems proximate the gates 104, in order to provide various information or instructions to the vehicles, e.g., drivers of vehicles, via the communication system. In some example embodiments, portions of various sensor systems and at least a portion of the communication system, as well as one or more processors, memories, or other components of a control system, may be combined, consolidated, or integrated into a sensor kiosk, as further described herein at least with respect to FIGS. 3B and 10.

As illustrated in the example of FIG. 1, the vehicles requesting entry/exit access at the gates 104 may comprise tractors 130A, 130B and associated trailers 135A, 135B. In such examples, the forward sensor systems 105A, 105B may detect or capture imaging data of front license plates or identifiers associated with the tractors 130A, 130B. In addition, the rearward sensor systems 107A, 107B may detect or capture imaging data of rear license plates or identifiers associated with the trailers 135A, 135B. Further, the rearward sensor systems 107A, 107B may detect or receive RFID tag information, e.g., identifiers or status data, from RFID tags that may be coupled to locks or latches that secure doors of the trailers 135A, 135B, e.g., rear doors of the trailers. Various additional sensor systems may detect motion or presence of tractors 130A, 130B and/or trailers 135A, 135B that are proximate the gates 104.

In other example embodiments, the vehicles requesting entry/exit access at the gates 104 may comprise motorcycles, passenger vehicles, commercial vehicles, vans, trucks, box trucks, or various other types of vehicles. Thus, the forward and rearward sensor systems 105, 107, as well as any additional sensor systems, may be positioned and oriented to enable capture of imaging data of identifiers, as well as detection of RFID tags and/or detection of motion or presence, associated with various types, lengths, and sizes of vehicles at the gates 104.

Although FIG. 1 illustrates a particular configuration, arrangement, or combination of components at an example entry/exit gate associated with a facility, various other example embodiments may include different configurations, arrangements, or combinations of components. For example, an entry/exit gate may include other numbers, sizes, or shapes of guard shacks, other numbers, configurations, or arrangements of gates, other numbers, positions, or orientations of various sensor systems, other combinations of sensor systems, communication systems, and/or control systems, and/or various other modifications to portions of entry/exit gates associated with facilities.

Figure 2:
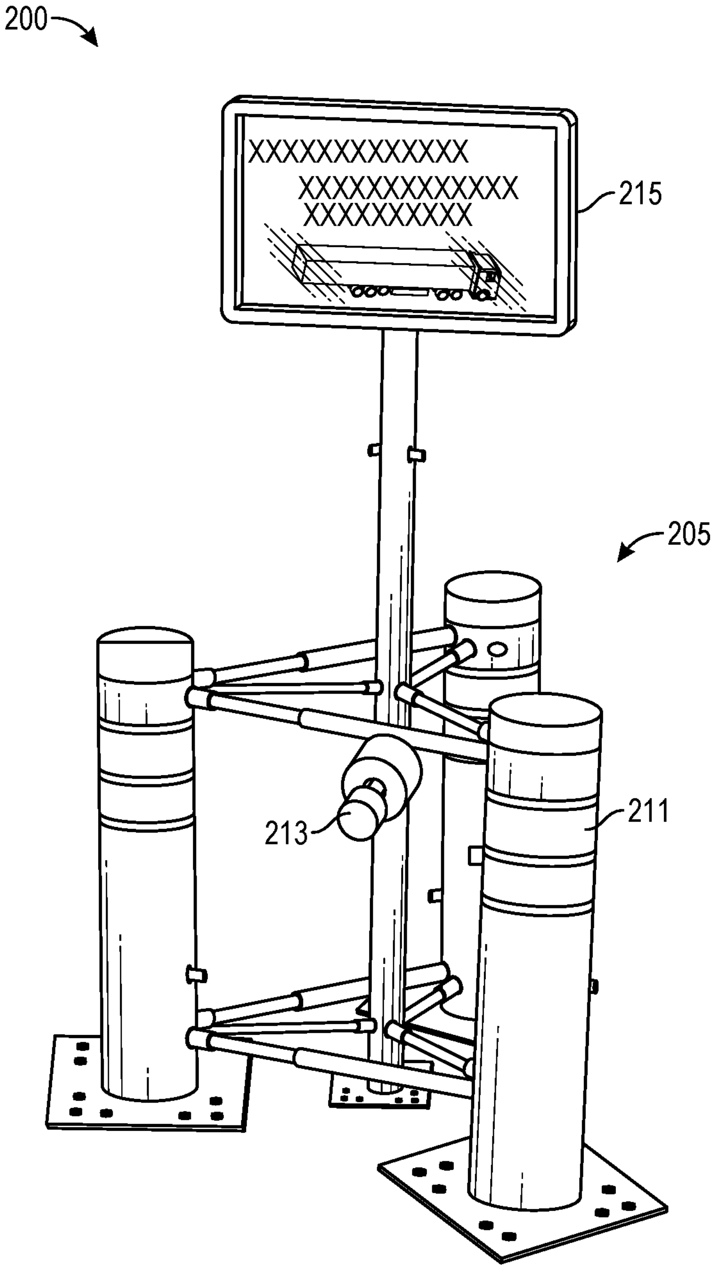
FIG. 2 is a schematic diagram of an example forward sensor system at an entry/exit gate associated with a facility, in accordance with implementations of the present disclosure.

FIG. 2 is a schematic diagram 200 of an example forward sensor system at an entry/exit gate associated with a facility, in accordance with implementations of the present disclosure. The example forward sensor system 205 of FIG. 2 may be similar to the forward sensor systems 105 described with respect to FIG. 1.

As shown in FIG. 2, an example forward sensor system 205 may comprise a base or structure 211, a forward or first imaging device 213, and/or one or more portions of a communication system, such as a display, screen, or monitor 215. The base or structure 211 may comprise various beams, columns, frames, bollards, pylons, or other structural members to provide support for various other components of the forward sensor system 205. In some examples, the base 211 may be formed or configured to provide protection to various components, such as the forward imaging device 213 and portions of the communication system, from impact, contact, or damage from vehicles in proximity.

In example embodiments, the forward imaging device 213 may be coupled to portions of the base 211. For example, the forward imaging device 213 may comprise one or more of various types of imaging devices or sensors, such as analog cameras, digital cameras, video cameras, stereo cameras, imaging sensors, depth sensors, or other types of imaging devices. The forward imaging device 213 may be positioned and oriented such that a front license plate, commercial vehicle identification number, or other identifier of a vehicle proximate a gate is within a field of view of the forward imaging device 213. The forward imaging device 213 may also include one or more additional or supplemental imaging devices that are positioned or oriented with a field of view toward a lateral side of a vehicle, e.g., to capture imaging data of commercial vehicle identification numbers or other identifiers on side panels, doors, or other lateral surfaces of a vehicle proximate a gate. Further, the forward imaging device 213 may include or be associated with a wireless communication device to enable transfer of data to and from a control system, as further described herein at least with respect to FIG. 10.

In addition, one or more portions of the communication system may be coupled to portions of the base 211. For example, a display, screen, or monitor 215 may be positioned or oriented to display or present information or instructions to a vehicle proximate a gate, e.g., to a driver of the vehicle. In addition to the display 215, various cameras, microphones, speakers, or other portions of the communication system may be coupled to the base 211, in order to receive and/or present various information or instructions to a vehicle proximate the gate, as further described herein. Further, the display 215, cameras, microphones, speakers, or other portions of the communication system may include or be associated with a wireless communication device to enable transfer of data to and from a control system, as further described herein at least with respect to FIG. 10.

Figure 3A:
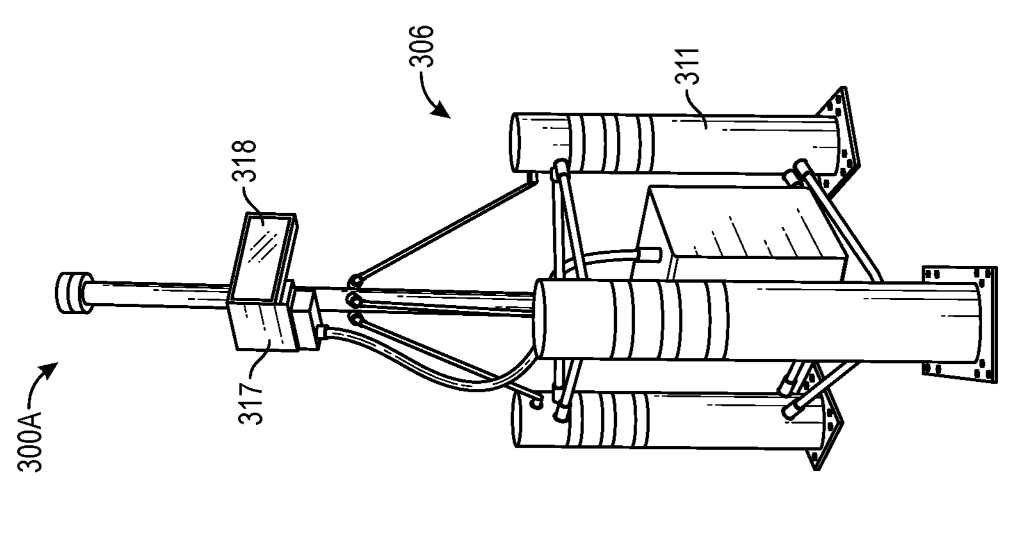
FIG. 3A is a schematic diagram of an example presence sensor system at an entry/exit gate associated with a facility, in accordance with implementations of the present disclosure.

FIG. 3A is a schematic diagram 300A of an example presence sensor system at an entry/exit gate associated with a facility, in accordance with implementations of the present disclosure. In some examples, the example presence sensor system 306 of FIG. 3A may form a portion of or be associated with either of the forward sensor systems 105 or rearward sensor systems 107 described with respect to FIGS. 1, 2, and 4.

As shown in FIG. 3A, an example presence sensor system 306 may comprise a base or structure 311, a motion or presence detection sensor 317, and/or a gate timer 318. The base or structure 311 may comprise various beams, columns, frames, bollards, pylons, or other structural members to provide support for various other components of the presence sensor system 306. In some examples, the base 311 may be formed or configured to provide protection to various components, such as the motion or presence detection sensor 317 or the gate timer 318, from impact, contact, or damage from vehicles in proximity.

In various example embodiments, the presence sensor system 306 may comprise a separate or distinct sensor system from the forward and rearward sensor systems 105, 107, and the presence sensor system 306 may be positioned generally between the forward and rearward sensor systems 105, 107. In other example embodiments, the presence sensor system 306 may be at least partially integrated with or associated with one or both of the forward and rearward sensor systems 105, 107.

In example embodiments, the motion or presence detection sensor 317 may be coupled to portions of the base 311. For example, the motion or presence detection sensor 317 may comprise various types of sensors, such as one or more cameras, imaging devices, imaging sensors, ultrasonic motion sensors, microwave motion sensors, laser based rangefinders, other ranging sensors, proximity sensors, or other types of motion or presence detection sensors. The motion or presence detection sensor 317 may be positioned and oriented such that a presence of a vehicle or a portion of a vehicle proximate a gate may be detected by the motion or presence detection sensor 317. Further, the motion or presence detection sensor 317 may include or be associated with a wireless communication device to enable transfer of data to and from a control system, as further described herein at least with respect to FIG. 10.

In addition, a gate timer 318 may be coupled to portions of the base 311. For example, the gate timer 318 may comprise a display or screen, or other visual and/or audio output devices, to provide an indication of an amount or duration of time that a vehicle is positioned proximate the gate. The gate timer 318 may be initiated based on detection of a presence of a vehicle by the motion or presence detection sensor 317. In this manner, the gate timer 318 may provide visual and/or audio feedback related to timely or efficient entry/exit operations at the gate. Further, data that may be presented by the gate timer 318 may also be used by portions of a control system to modify, expedite, or troubleshoot various aspects of entry/exit operations at the gate that may be causing unnecessary or unexpected delays. In some examples, a target duration of time for automated entry/exit operations may be defined, such as thirty seconds, one minute, two minutes, or other durations or ranges of times, in order to identify potential improvements to various aspects of automated processing at the gates.

Moreover, a global positioning system (GPS) receiver may be coupled to portions of the base 311. For example, although not illustrated in FIG. 3A, a GPS receiver or other position detection device may be positioned or oriented to receive location data from various GPS devices onboard or associated with vehicles that may request access via the gate. In some examples, a geofence having a defined radius or distance around the gate may be monitored, and the GPS receiver may receive location data from various GPS devices as they enter or exit the geofence. Various portions of the entry/exit processing and operations described herein may be performed at least partially in advance or predictively based on expected times of departure or arrival that may be estimated using location data received by the GPS receiver. Further, the GPS receiver may include or be associated with a wireless communication device to enable transfer of data to and from a control system, as further described herein at least with respect to FIG. 10.

Furthermore, one or more portions of the communication system may also be coupled to portions of the base 311. For example, although not illustrated in FIG. 3A, a display, screen, monitor, cameras, microphones, speakers, or other portions of the communication system may be positioned or oriented to display or present information or instructions to a vehicle proximate a gate, e.g., to a driver of the vehicle, as further described herein. Further, the display, cameras, microphones, speakers, or other portions of the communication system may include or be associated with a wireless communication device to enable transfer of data to and from a control system, as further described herein at least with respect to FIG. 10.

In some example embodiments, based on detection of a presence of a vehicle proximate a gate by the motion or presence detection sensor 317, detection or capture of imaging data by the forward and/or rearward sensor systems 105, 107 may be initiated. In this manner, the detection of a presence of a vehicle by the motion or presence detection sensor 317 may function or operate as a trigger for capture of imaging data of one or more identifiers associated with the vehicle by various imaging devices, as well as receipt or capture of other data by one or more other sensors described herein.

In alternative example embodiments, detection or capture of data by any of the other sensors described herein may instead function or operate as a trigger for one or more other sensors. For example, receipt of location data by a GPS receiver from a GPS device onboard a vehicle may operate as a trigger for one or more other sensors, detection of a front license plate by a forward imaging device may operate as a trigger for one or more other sensors, detection of a rear license plate by a rearward imaging device may operate as a trigger for one or more other sensors, detection of a RFID tag by a RFID reader may operate as a trigger for one or more other sensors, and/or various other receipt, detection, or capture of data by various sensors may act as triggers for various other sensors described herein.

Figure 3B:
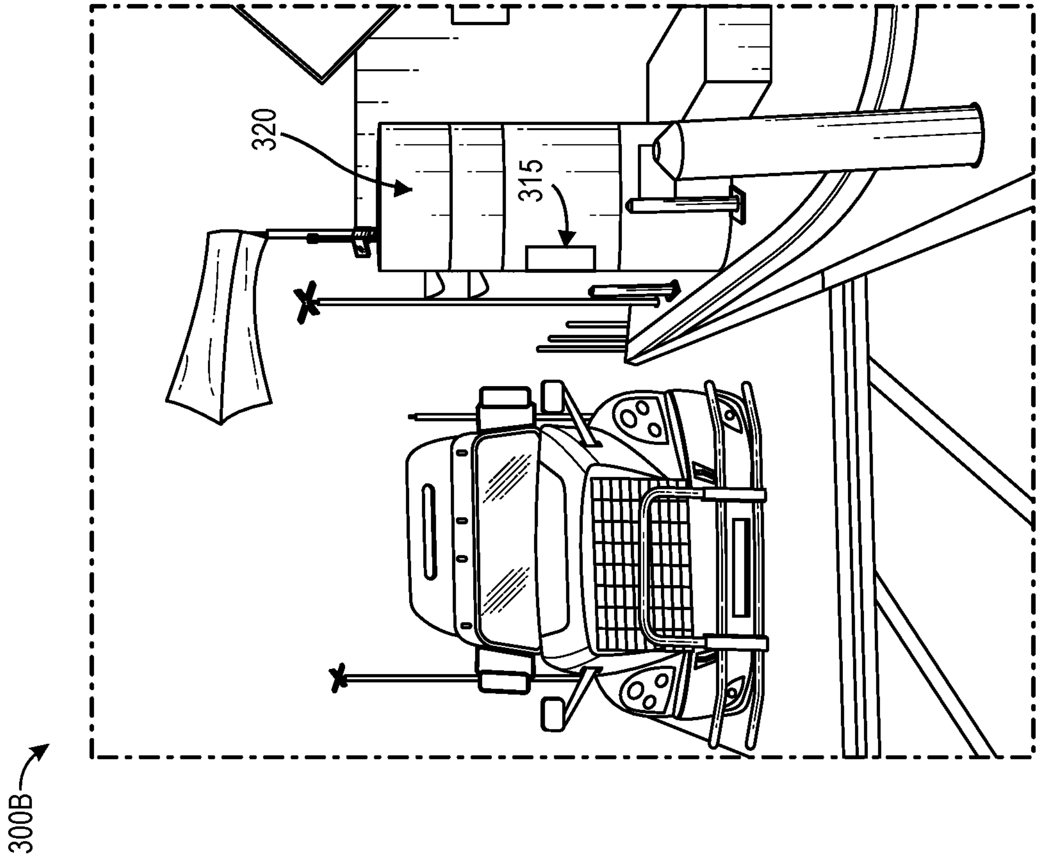
FIG. 3B is a schematic diagram of an example sensor kiosk at an entry/exit gate associated with a facility, in accordance with implementations of the present disclosure.

FIG. 3B is a schematic diagram 300B of an example sensor kiosk at an entry/exit gate associated with a facility, in accordance with implementations of the present disclosure. The example sensor kiosk 320 of FIG. 3B may include any and all of the features of the forward sensor systems 105, 205 and/or presence sensor systems 306 described with respect to FIGS. 1, 2, and 3A. In further example embodiments, the example sensor kiosk 320 of FIG. 3B may also include any and all of the features of the rearward sensor systems 107, 407 described with respect to FIGS. 1 and 4.

As shown in FIG. 3B, the example sensor kiosk 320 may comprise a combined, consolidated, or integrated structure or assembly that may include various sensor systems, communication systems, and/or control systems described herein. For example, the sensor kiosk 320 may include structural members or supports similar to bases 211, 311, forward imaging devices 213, a display, screen, or monitor 315 similar to the display 215 described with respect to FIG. 2, cameras, microphones, speakers, or other portions of a communication system, motion or presence detection sensors 317, gate timers 318, GPS receivers or other position detection sensors, and/or wireless communication devices, as well as processors, memories, or other portions of a control system, as further described herein at least with respect to FIG. 10.

The combined or consolidated sensor kiosk 320 may provide a visual point of reference for drivers of vehicles proximate the gates. As a result, when drivers stop or pause next to the sensor kiosk 320 for automated entry/exit operations, the vehicles may be appropriately positioned relative to various sensor systems at the gates that may capture identifiers and other data or information related to the vehicles to facilitate automated processing. Further, the portions of the communication system incorporated into the sensor kiosk 320 may facilitate effective communication of various information or instructions to drivers of vehicles responsive to determinations related to allowing or denying access via the gates.

Further, the combined or consolidated sensor kiosk 320 may facilitate modular design and/or assembly of the various systems incorporated therein. In addition, the combined or consolidated sensor kiosk 320 may facilitate fast and efficient service, repair, maintenance, and/or replacement of all or portions of the various systems incorporated therein.

Figure 4:
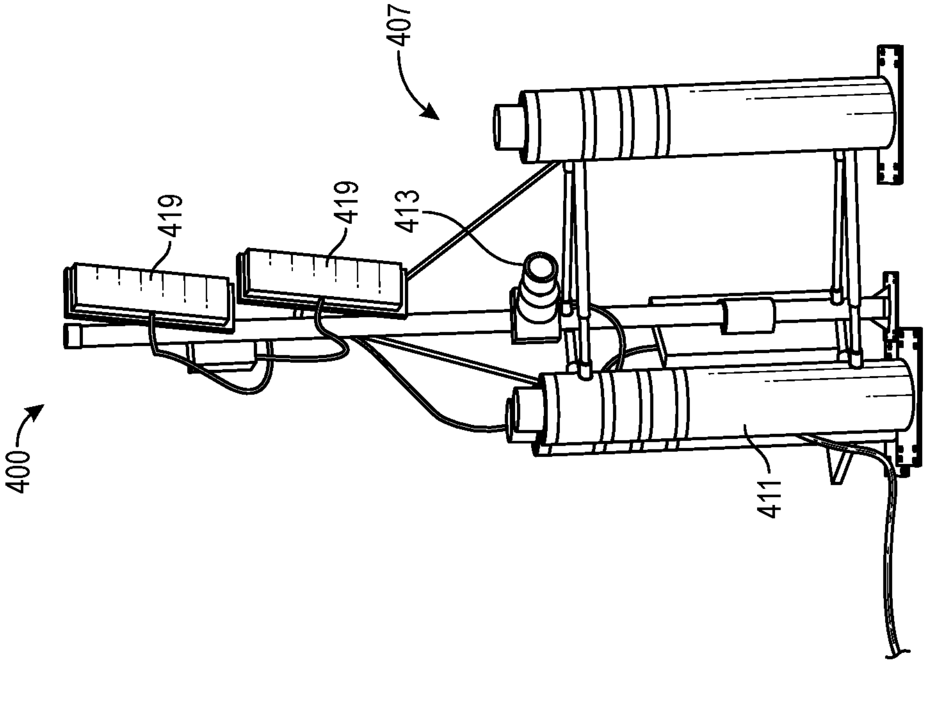
FIG. 4 is a schematic diagram of an example rearward sensor system at an entry/exit gate associated with a facility, in accordance with implementations of the present disclosure.

FIG. 4 is a schematic diagram 400 of an example rearward sensor system at an entry/exit gate associated with a facility, in accordance with implementations of the present disclosure. The example rearward sensor system 407 of FIG. 4 may be similar to the rearward sensor systems 107 described with respect to FIG. 1.

As shown in FIG. 4, an example rearward sensor system 407 may comprise a base or structure 411, a rearward or second imaging device 413, and/or one or more radiofrequency identification (RFID) readers or sensors 419. The base or structure 411 may comprise various beams, columns, frames, bollards, pylons, or other structural members to provide support for various other components of the rearward sensor system 407. In some examples, the base 411 may be formed or configured to provide protection to various components, such as the rearward imaging device 413 and RFID readers 419, from impact, contact, or damage from vehicles in proximity.

In example embodiments, the rearward imaging device 413 may be coupled to portions of the base 411. For example, the rearward imaging device 413 may comprise various types of imaging devices or sensors, such as one or more analog cameras, digital cameras, video cameras, stereo cameras, imaging sensors, depth sensors, or other types of imaging devices. The rearward imaging device 413 may be positioned and oriented such that a rear license plate, commercial vehicle identification number, or other identifier of a vehicle proximate a gate is within a field of view of the rearward imaging device 413. Further, the rearward imaging device 413 may include or be associated with a wireless communication device to enable transfer of data to and from a control system, as further described herein at least with respect to FIG. 10.

In addition, one or more RFID readers or sensors 419 may be coupled to portions of the base 411. For example, the RFID readers 419 may comprise various types of readers or sensors configured to detect RFID tags that may be coupled to or associated with portions of vehicles. In some examples, the RFID tags may be coupled or attached to locks, latches, or other closures of various doors of vehicles, and the doors may comprise trunks, trailer doors, swing doors, ramp doors, or other types of doors associated with vehicles or trailers. The RFID readers 419 may be positioned and oriented such that RFID tags that are coupled to or associated with latches of vehicle doors proximate a gate may be detected and interrogated. Various information may be read or received by the RFID readers 419 from the RFID tags, such as identifiers, status, or other data. The identifiers of RFID tags may uniquely identify individual RFID tags from other RFID tags, and the status data may comprise data related to closed, open, sealed, unsealed, broken, tampered, altered, or other states related to the RFID tags. Further, the RFID readers 419 may include or be associated with a wireless communication device to enable transfer of data to and from a control system, as further described herein at least with respect to FIG. 10.

Figure 5:
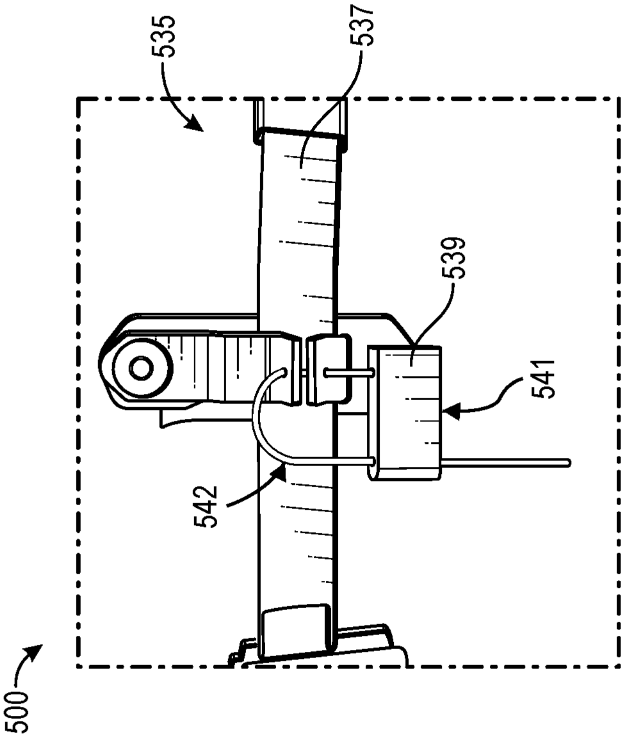
FIG. 5 is a schematic diagram of an example radiofrequency identification (RFID) tag associated with a trailer, in accordance with implementations of the present disclosure.

FIG. 5 is a schematic diagram 500 of an example radiofrequency identification (RFID) tag associated with a trailer, in accordance with implementations of the present disclosure.

As shown in FIG. 5, an RFID tag, seal, or latch 539 may be coupled or attached to a lock, latch, or closure 537 associated with a door of a vehicle. In the example illustrated in FIG. 5, the vehicle may comprise a trailer 535 that is pulled by a tractor, and the latch or closure 537 may secure one or more trailer doors, swing doors, ramp doors, or other types of doors of the trailer 535 in a closed position.

In example embodiments, the RFID tag or seal 539 may be coupled or attached to the latch or closure 537 such that the trailer door of the trailer 535 may not be opened unless the RFID tag or seal 539 is opened, unsealed, removed, cut, broken, or otherwise damaged. In addition, any damage, modification, or removal of the RFID tag or seal 539 may alter or affect the data that is read from the RFID tag by an RFID reader. In this manner, the coupling of the RFID tag or seal 539 to the latch or closure 537 may ensure that the trailer door has not been opened since the time that the RFID tag or seal 539 was attached, and thereby further ensure that contents of the trailer 535 have not been tampered with since the time that the RFID tag or seal 539 was attached.

For example, an example RFID tag or seal 539 may comprise at least two circuits. A first circuit may be associated with a main body 541 or portion of the RFID tag, and data associated with the first circuit may encode an identifier that uniquely identifies the RFID tag with respect to other RFID tags. In addition, a second circuit may be associated with a loop or strap 542 of the RFID tag that is routed through a portion of the latch or closure 537 of a door of a vehicle, and the data associated with the second circuit may indicate a status of the second circuit, e.g., closed, sealed, intact vs. open, unsealed, broken.

As a result, an RFID reader may interrogate the RFID tag or seal 539, and in response, the RFID reader may receive an identifier from the first circuit and/or status data from the second circuit. If the identifier received from the first circuit matches the expected identifier of the first circuit that was previously attached to the latch 537, the identifier may be determined to be a matching identifier. However, if the identifier received from the first circuit does not match the expected identifier of the first circuit that was previously attached to the latch 537, the identifier may be determined to be a mismatched identifier. Further, if an identifier is not received from the first circuit, the identifier may be determined to be a missing identifier.

Moreover, if the status data received from the second circuit indicates a closed, sealed, or intact circuit, the status may be determined to be a good or intact latch 537 of the door of the vehicle. However, if the status data received from the second circuit indicates an open, unsealed, or broken circuit, the status may be determined to be a bad or tampered latch 537 of the door of the vehicle. Various combinations of identifiers and/or status data may be received from RFID tags or seals 539 that are coupled with latches 537 of doors of vehicles.

Accordingly, as described herein with respect to FIG. 4, one or more RFID readers 419 positioned at gates of facilities may read or interrogate any RFID tags 539 that may be coupled or attached to locks, latches, or closures of various doors of the vehicles. Based on the data that is received from the RFID tags, various determinations may be made regarding the identification and status of the RFID tags. For scenarios in which an RFID tag has not been opened, unsealed, removed, modified, or damaged, the data read by the RFID readers 419 from the RFID tags may include an identifier that matches the identifier upon initial coupling of the RFID tag to the latch or closure of the vehicle, as well as status data that indicates a closed, sealed, intact, unbroken, and/or unmodified RFID tag. For additional scenarios in which an RFID tag has been opened, unsealed, modified, or damaged, the data read by the RFID readers 419 from the RFID tags may include an identifier that matches the identifier upon initial coupling of the RFID tag to the latch or closure of the vehicle, but may also include status data that indicates an open, unsealed, modified, and/or broken RFID tag. For other scenarios in which an RFID tag has been removed, modified, or damaged, the data read by the RFID readers 419 from the RFID tags may include a missing or incorrect identifier that does not match the identifier upon initial coupling of the RFID tag to the latch or closure of the vehicle, as well as status data that indicates an open, unsealed, missing, broken, and/or modified RFID tag. For further scenarios in which an RFID tag has been removed and replaced, the data read by the RFID readers 419 from the RFID tags may include an incorrect or mismatched identifier that does not match the identifier upon initial coupling of the RFID tag to the latch or closure of the vehicle, while also including status data that indicates a closed, sealed, intact, unbroken, and/or unmodified RFID tag.

Using data read from RFID tags, chain of custody of contents of vehicles and/or trailers may be more reliably monitored and recorded. In addition, potential sources of variability or uncertainty with respect to chain of custody may be more accurately and precisely identified or determined based on the data read by RFID readers from RFID tags applied to latches, locks, or closures of doors of vehicles. Furthermore, identifiers and/or status data of circuits of RFID tags or seals that have been applied to latches of doors or vehicles may be recorded or saved as part of pre-registration information described herein upon initial coupling of such RFID tags or seals to latches, locks, or closures.

Figure 6:
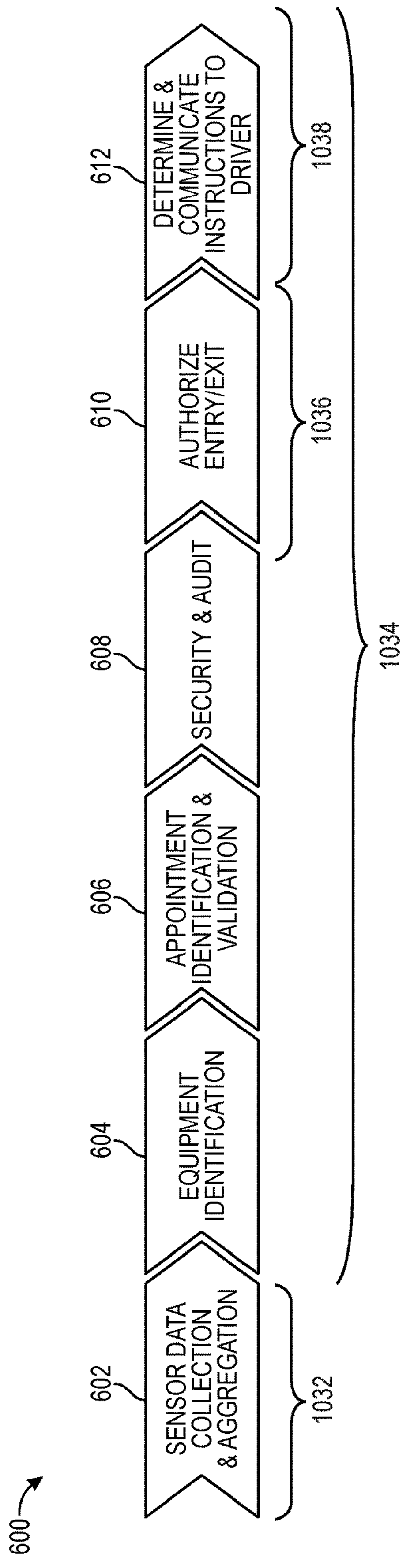
FIG. 6 is a schematic flow diagram of an example automated entry/exit operation at a facility, in accordance with implementations of the present disclosure.

FIG. 6 is a schematic flow diagram 600 of an example automated entry/exit operation at a facility, in accordance with implementations of the present disclosure.

As shown in FIG. 6, the example automated entry/exit operation at a facility may begin with sensor data collection and aggregation, as at 602. For example, various data associated with vehicles proximate gates of a facility may be received, detected, or captured using the various sensors described herein. As described at least with respect to FIGS. 1-5, the various data may include location data from GPS receivers or other position detection sensors, presence data from motion or presence detection sensors, vehicle identification data based on detected or captured identifiers, license plates, commercial vehicle identification numbers (e.g., USDOT numbers), vehicle identification numbers (VINs), and/or other identifying information, and/or RFID data from RFID tags or seals coupled to locks, latches, or closures of vehicles. The various data may be consolidated to generate gate sensor events for individual vehicles, and the gate sensor events may be further processed to determine access authorizations for such vehicles. In some examples, a data collection subsystem 1032 of a control system may facilitate or perform the operations related to sensor data collection and aggregation, as further described herein with respect to FIG. 10.

The example automated entry/exit operation at a facility may continue with equipment identification, as at 604. For example, based on the various data consolidated into a gate sensor event, the equipment or vehicle that has been detected proximate a gate of the facility may be identified. By consolidating data from various sensors, the vehicle that is proximate the gate may be more reliably and accurately identified. In some examples, various identifiers detected or captured with respect to the vehicle may be compared with known vehicle identifiers. In addition, location data captured by GPS receivers or other position detection sensors may be compared with a current known location of the vehicle. Further, data read from a RFID tag or seal coupled to the vehicle may be compared to expected data associated with a RFID tag or seal that was previously coupled to the vehicle. In this manner, the vehicle that is proximate the gate of the facility may be identified.

The example automated entry/exit operation at a facility may continue with appointment identification and validation, as at 606. For example, carriers, operators, and/or drivers of vehicles may provide or generate pre-registration information related to transport of materials to, between, and from various facilities. The pre-registration information may include appointment data related to the carrier, operator, driver, vehicle, origin, destination, time, purpose or status, and/or other data. The data related to carriers, operators, or drivers may include names, addresses, contact information, qualifications or certifications, or other information. The data related to vehicles may include vehicle type, size, or class, vehicle identifiers, license plate numbers, USDOT numbers, VINs, or other types of identifiers. The data related to origin may include an origin facility or warehouse, and the data related to destination may include a destination facility or warehouse. In addition, the data related to time may include date and time information related to departure from an origin, arrival to a destination, or other milestones or waypoints during transport. Further, the data related to purpose or status may include transport purpose, such as dropping off payload, picking up payload, or others, as well as payload status, such as full, partial, empty, or others. Moreover, some of the pre-registration information may also be generated or created by facility personnel or control systems associated with facilities and/or yards, such as data related to payloads, origin facilities, destination facilities, expected arrival times, expected departure times, RFID tag or seal data, and/or various other data related to entry and/or exit appointments.

In additional example embodiments, at least portions of the pre-registration information may be generated automatically based on received information, and/or may be predicted or generated by machine learning models or algorithms that have processed prior pre-registration information. In some examples, a carrier may be automatically assigned a series or schedule of appointments to pick up and drop off payloads along a path or route including a series of locations. In other examples, if a carrier schedules an appointment to pick up a payload at a first location at a first time, a corresponding appointment to drop off the payload at a second location at a second time may be automatically generated, e.g., based on a scheduled drop off time at the second location, and/or based on machine learning related to a distance between the locations, expected travel route, and/or expected duration. In further examples, if a carrier schedules an appointment to drop off a payload at a first location at a first time, a corresponding appointment to pick up a new payload from the first location at a second time may be automatically generated, e.g., based on a scheduled departure time from the first location, and/or based on machine learning related to a driver, vehicle, payload, transport capabilities, and/or other carrier characteristics. Various other data related to appointments, combinations of appointments, or individual aspects or portions of appointments may also be generated automatically or based on machine learning models or algorithms to ensure safe, reliable, and efficient transport of payloads between locations.

The equipment or vehicle identification may be compared with the appointment data of the pre-registration information to determine whether there is a match between the vehicle identification and the appointment data. The determination of a match may be based on comparison of detected vehicle identifiers with pre-registered vehicle information, comparison of current vehicle location with pre-registered origin or destination information, comparison of current day and time with pre-registered departure or arrival day and time information, and/or comparison of current facility or yard status and pre-registered purpose or status information. Generally, an appointment may be validated if the correct, pre-registered vehicle is located at the correct, pre-registered location or facility at the correct, pre-registered day and time for the correct, pre-registered purpose. By automatically comparing vehicle identification data with appointment data of pre-registration information, processing and/or waiting time for vehicles at a gate of a facility may be significantly reduced, e.g., from approximately three to five minutes or longer to approximately one to two minutes or shorter.

The example automated entry/exit operation at a facility may continue with security and audit, as at 608. For example, the security and audit determination may be performed simultaneously or at least partially concurrently with appointment identification and validation. In some examples, if a vehicle identification does not match an expected vehicle identifier of the appointment data, such as license plate numbers, USDOT numbers, VINs, or other identifiers, access authorization may be denied to the vehicle that is not identified or expected. Further, even if a trailer and/or payload may be expected and validated, if a tractor that is associated with the trailer is not identified or validated, access may be denied based on the mismatched vehicle identification of the tractor, or vice versa.

In additional examples, if data read from a RFID tag or seal coupled to a lock, latch, or closure of a vehicle indicates a mismatched, missing, broken, or otherwise modified identification or status relative to expected data from a RFID tag or seal previously coupled to the lock, latch, or closure of the vehicle, access authorization may be denied to the vehicle based on the mismatched, missing, broken, or modified RFID tag or seal. Such mismatched, missing, broken, or modified data from a RFID tag or seal may indicate insecurity, uncertainty, or tampering with respect to chain of custody of contents of the vehicle or trailer. In alternative examples, a vehicle having such a mismatched, missing, broken, or modified RFID tag or seal may nonetheless be granted access authorization, but further corrective or remedial actions or operations may be initiated either to first verify and validate contents of the vehicle or trailer, or to later identify potential root causes and/or mitigation actions based on the insecure or uncertain chain of custody.

The example automated entry/exit operation at a facility may continue with authorizing entry/exit, as at 610. For example, based on a determined match between data associated with a vehicle identification and appointment data of pre-registration information, access authorization via a gate of a facility may be granted or allowed. The access authorization may be associated with entry via a gate to a facility or associated yard, e.g., arrival to the facility, or may be associated with exit via a gate from a facility and associated yard, e.g., departure from the facility. As described herein, the various data detected or captured by the various sensor systems described herein may be consolidated into a gate sensor event in order to compare with pre-registration information having appointments data, to thereby determine whether to allow or deny access authorization.

Furthermore, responsive to granting access authorization to a vehicle, a gate, fence, boom arm, or other movable barrier may be actuated or operated to allow access via the gate to or from the facility. For example, the gate, fence, arm, or other movable barrier may include various types of actuators or motors to move the barrier between closed and open positions. In addition, a wireless actuation device may be associated with the gate, fence, arm, or other movable barrier and in communication with the actuators or motors. In this manner, a control system may automatically initiate actuation or operation of the movable barrier via instructions or commands transmitted to the wireless actuation device, such that the movable barrier may be automatically moved between open and closed positions responsive to determined access authorizations described herein. In some examples, an automated gate actuation subsystem 1036 of a control system may facilitate or perform the operations related to authorizing entry/exit, as further described herein with respect to FIG. 10.

The example automated entry/exit operation at a facility may continue with determination and communication of instructions to a driver, as at 612. For example, various actions or operations may be instructed for vehicles associated with matched or validated appointments, as well as vehicles associated with mismatched or non-validated appointments. For example, various information or instructions may be provided to drivers of vehicles, such as information related to aspects of entry/exit authorizations, standard rules of operation within a yard of a facility, directing drivers to particular dock doors, parking locations, drop off locations, or pick up locations, instructing performance of various tasks or operations, enabling contact or coordination with various facility personnel, and/or various other information or instructions. In addition, the information related to aspects of entry/exit authorizations may include indications of matched or mismatched data relative to pre-registration information, indications or confirmations of carrier, operator, driver, and/or vehicle information, indications or confirmations of location, day, and time information, indications or confirmations of purpose or status information, indications or confirmations related to various other appointment data, information or rationales related to allowing access or denying access, information or instructions for corrective or remedial actions to obtain access authorizations, and/or other information or instructions. Further, the various information or instructions may be provided via communication systems positioned proximate the gates, and/or may be provided via various other computing devices and associated applications, such as computers, laptops, mobile phones, or other portable electronic devices.

In addition, the validated appointment data may be shared with other computing or control systems and facility personnel that manage operations of various portions of the facility to enable more efficient and timely processing of payloads associated with various transport vehicles and their scheduled appointments. Further, the validated appointment data may be communicated to various facility personnel via various computing devices and associated applications, such as computers, laptops, mobile phones, or other portable electronic devices. In some examples, an information communication subsystem 1038 of a control system may facilitate or perform the operations related to determination and communication of instructions to drivers, other systems, or personnel, as further described herein with respect to FIG. 10.

Figure 10:
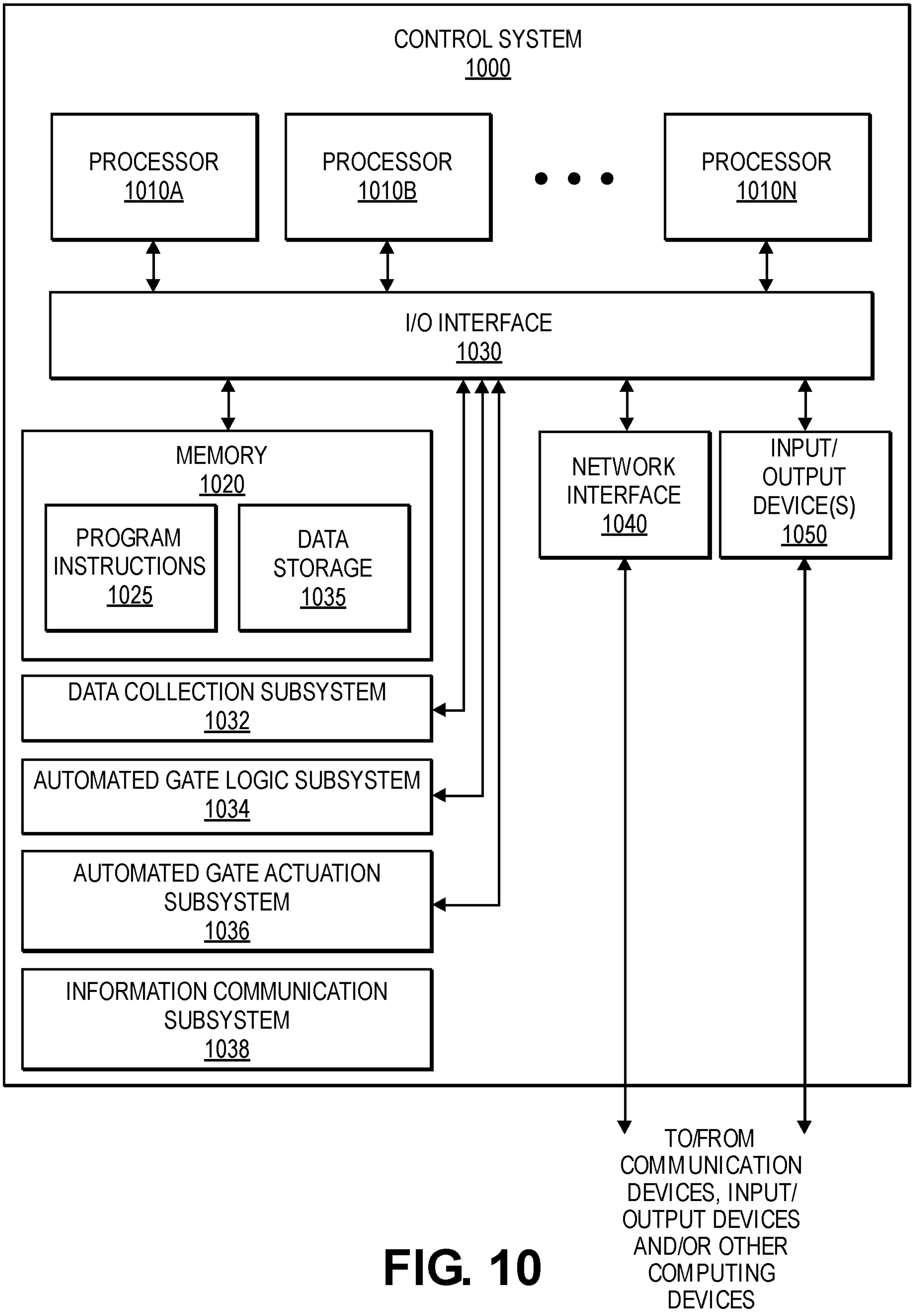
FIG. 10 is a block diagram illustrating various components of an example control system, in accordance with implementations of the present disclosure.

Furthermore, in some examples, an automated gate logic subsystem 1034 of a control system may facilitate, perform, or instruct processing and/or operations related to equipment identification, appointment identification and validation, security and audit, entry/exit authorization, and determination and communication of instructions, as further described herein with respect to FIG. 10.

In some example embodiments, the example automated entry/exit operation at a facility may be fully automated. As a result, the sensor data collection, vehicle identification, appointment validation, security audit, access authorization, and communication of information and instructions may be performed automatically by a control system based on the various data of gate sensor events and appointment data of pre-registration information. In addition, information or instructions related to allowed or denied access authorizations may be automatically presented or displayed to facilitate corrective or remedial actions by drivers of vehicles and/or facility personnel.

In other example embodiments, the example automated entry/exit operation at a facility may be partially automated. As a result, the sensor data collection, vehicle identification, appointment validation, security audit, access authorization, and communication of information and instructions may be performed substantially automatically by a control system based on the various data of gate sensor events and appointment data of pre-registration information. However, in scenarios in which access authorization is denied due to incomplete, mismatched, or unverified information, the various data related to gate sensor events and appointment data of pre-registration information may be provided to a human agent or associate. Then, the human agent or associate may review the data and information to attempt to manually provide access authorization, which may further include communication with drivers of vehicles such as requests for additional information or instructions for corrective or remedial actions to receive access authorization.

In further example embodiments, portions of the example automated entry/exit operation at a facility may be supported or confirmed by human agents or associates. For example, determined access authorizations may be transmitted to human agents or associates, who may be either locally present in guard shacks at the gates or remotely located at a command and control center, such that the human agents may confirm the automatically processed data and determined access authorizations before ultimately granting or denying access. In addition, opening and/or closing of gates, fences, or other barriers in response to granting access authorization may be initiated, actuated, or performed by human agents or associates, who may again be either locally present in guard shacks at the gates or remotely located at a command and control center. In addition, various information or instructions may also be provided to drivers of vehicles by human agents or associates, e.g., agents locally present in guard shacks at the gates, within a yard, or at other portions of a facility, or agents remotely located at a command and control center associated with and in communication with the facility.

Figure 7:
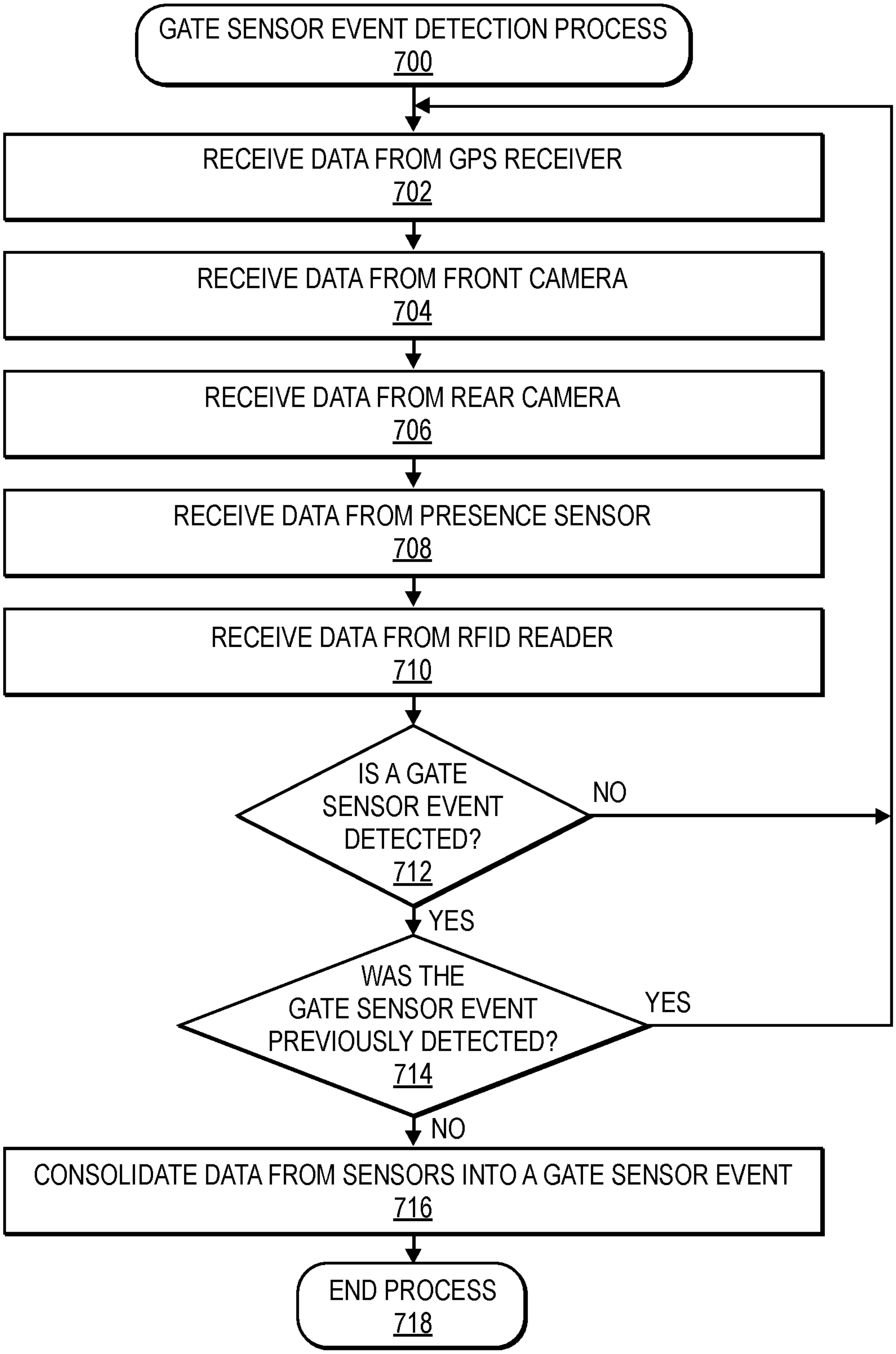
FIG. 7 is a flow diagram illustrating an example gate sensor event detection process, in accordance with implementations of the present disclosure.

FIG. 7 is a flow diagram illustrating an example gate sensor event detection process 700, in accordance with implementations of the present disclosure.

The process 700 may begin by receiving data from a global positioning system (GPS) receiver, as at 702. For example, one or more GPS receivers or other position detection sensors may be included in or associated with various sensor systems described herein. The GPS receivers may receive location data of one or more vehicles or other equipment that may be scheduled to depart from or arrive at gates of one or more facilities and associated yards. In addition, the vehicles or equipment may include GPS devices that may communicate and transmit location data to various GPS receivers via satellite networks, telecommunications networks, or other types of networks. Moreover, various geofences may be associated with gates, facilities, and yards to determine or predict departure or arrival of vehicles or equipment based on location data. Further, a control system may receive location data associated with vehicles from one or more GPS receivers.

The process 700 may continue by receiving data from a front camera, as at 704. For example, one or more front, forward, or first imaging devices or sensors may capture imaging data of a vehicle that is proximate a gate of a facility. The forward imaging device may be associated with a forward sensor system, or other sensor systems described herein. The imaging data captured by the forward imaging device may include representations of one or more identifiers associated with the vehicle, such as a front license plate, a commercial vehicle identification number, a vehicle identification number, or other identifiers. Further, a control system may receive imaging data of a vehicle proximate a gate from a forward imaging device.

The process 700 may proceed by receiving data from a rear camera, as at 706. For example, one or more rear, rearward, or second imaging devices or sensors may capture imaging data of a vehicle that is proximate a gate of a facility. The rearward imaging device may be associated with a rearward sensor system, or other sensor systems described herein. The imaging data captured by the rearward imaging device may include representations of one or more identifiers associated with the vehicle, such as a rear license plate, a commercial vehicle identification number, a vehicle identification number, or other identifiers. Further, a control system may receive imaging data of a vehicle proximate a gate from a rearward imaging device.

The process 700 may continue to receive data from a presence sensor, as at 708. For example, one or more motion, presence, or ranging sensors may detect a presence of a vehicle that is proximate a gate of a facility. The presence sensors may be associated with a forward sensor system, a rearward sensor system, a separate intermediate sensor system, or other sensor systems or kiosks described herein. The data received or detected by the presence sensor may indicate presence of a vehicle, as well as amount or duration of time that a vehicle is present and/or waiting proximate the gate. Further, a control system may receive presence data of a vehicle proximate a gate from a presence sensor.

The process 700 may proceed to receive data from a radiofrequency identification (RFID) reader, as at 710. For example, one or more RFID readers or sensors may receive or detect data from a RFID tag coupled to a vehicle that is proximate a gate of a facility. The RFID tag may generally be coupled to a lock, latch, or closure that secures a door or other opening of the vehicle in a closed position. The RFID readers may be associated with a rearward sensor system, or other sensor systems described herein. The data received or detected by the RFID reader may include an identifier and/or a status of the RFID tag, such as sealed, intact, missing, unsealed, broken, modified, or other states. Further, a control system may receive data from a RFID tag coupled to a vehicle proximate a gate from a RFID reader.

The process 700 may continue with determining whether a gate sensor event is detected, as at 712. For example, based on one or more of the various data received from various sensors, it may be determined whether a gate sensor event has been detected, e.g., whether a vehicle is proximate a gate of a facility and seeking access authorization. A gate sensor event may be indicated by presence of a vehicle proximate the gate, imaging data that includes a representation of at least one vehicle identifier of a vehicle proximate the gate, and/or data from a RFID tag coupled to a vehicle proximate the gate. Further, a control system may determine whether a gate sensor event is detected. If a gate sensor event is not determined to have been detected, the process 700 may return to steps 702-710 to continue to receive data from various sensors.

If, however, a gate sensor event is determined to have been detected, the process 700 may proceed with determining whether the gate sensor event was previously detected, as at 714. For example, based on one or more of the various data received from various sensors, and further based on previously detected gate sensor events, it may be determined whether the data associated with a current gate sensor event matches data associated with a previous gate sensor event, e.g., an immediately previously detected gate sensor event. Further, a control system may determine whether the gate sensor event was previously detected. If the current gate sensor event matches the previous gate sensor event, it may be determined that a same gate sensor event has been detected during a duration of the time that the same vehicle is present and/or waiting at the gate, and the process 700 may return to steps 702-710 to continue to receive data from various sensors.

If, however, the current gate sensor event does not match the previous gate sensor event, it may be determined that the current gate sensor event is a new gate sensor event for which access authorization is to be determined. Then, the process 700 may continue by consolidating the data from the various sensors into a gate sensor event, as at 716. For example, the various data received from the various sensors associated with the vehicle proximate a gate of a facility may be combined or consolidated into a single gate sensor event. Then, based on the data of the gate sensor event, access authorization processing may be performed to determine whether to allow or deny access to the vehicle via the gate, as further described herein at least with respect to FIGS. 8 and 9. Further, a control system may consolidate the data from various sensors into a gate sensor event for further processing.

The process 700 may then end, as at 718.

Figure 8:
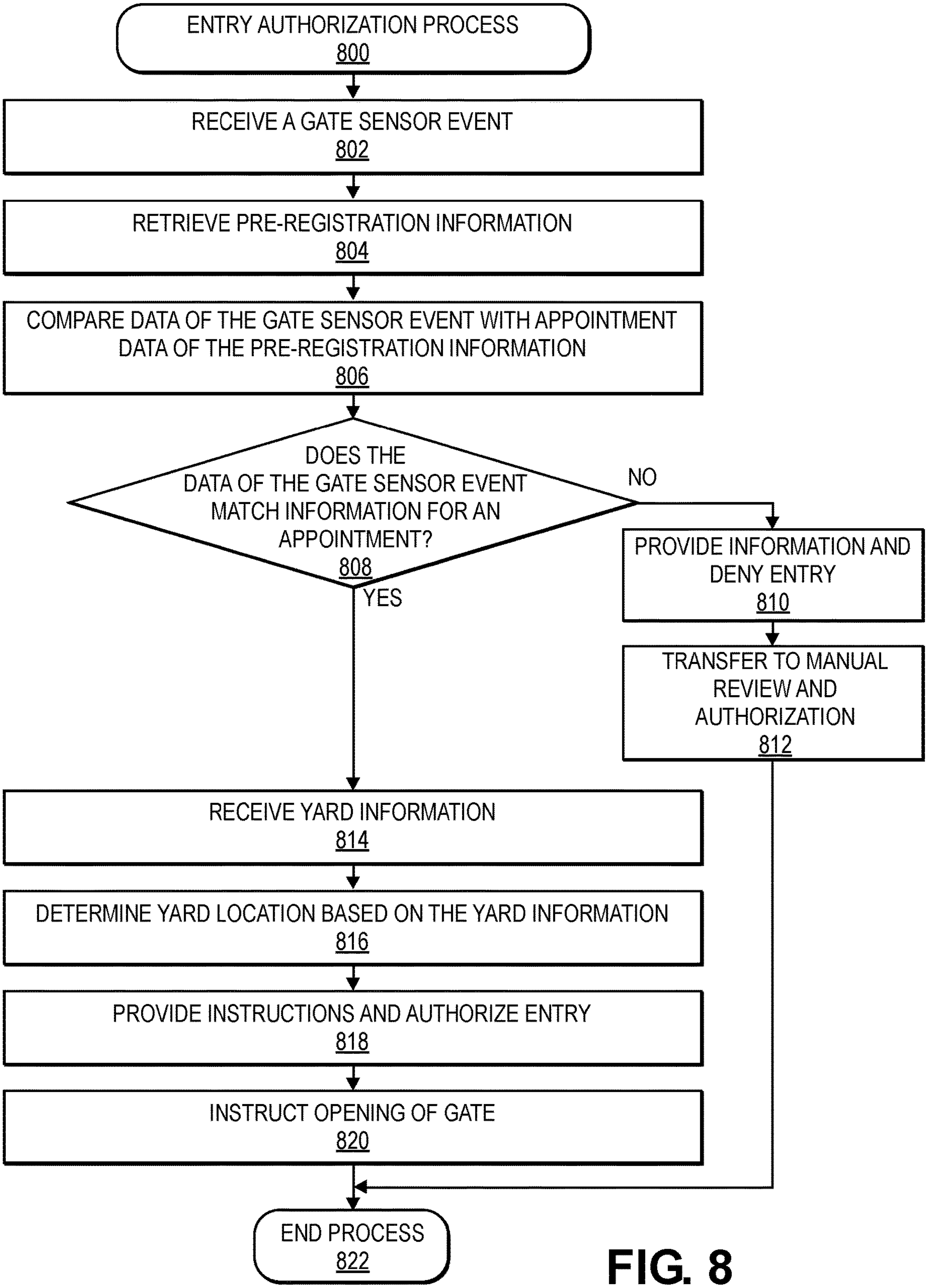
FIG. 8 is a flow diagram illustrating an example entry authorization process, in accordance with implementations of the present disclosure.

FIG. 8 is a flow diagram illustrating an example entry authorization process 800, in accordance with implementations of the present disclosure.

The process 800 may begin by receiving a gate sensor event, as at 802. For example, a gate sensor event may comprise data from various sensors that have been combined or consolidated based on a determination that a vehicle is proximate a gate of a facility and seeking access authorization. The receipt of various data and generation of a gate sensor event is described herein at least with respect to FIG. 7. Further, a control system may receive a gate sensor event.

The process 800 may continue by retrieving pre-registration information, as at 804. For example, pre-registration information may comprise appointments data related to vehicles or equipment departing from or arriving to gates of facilities. As described herein, the appointments data may comprise information related to carriers, operators, drivers, vehicles, origins, destinations, times, purpose or status, and/or other data. The pre-registration information may be stored in various data stores that may be maintained locally at one or more facilities or remotely in cloud data storage. Further, a control system may retrieve the pre-registration information.

The process 800 may proceed by comparing data of the gate sensor event with appointment data of the pre-registration information, as at 806. For example, imaging data including representations of vehicle identifiers of the vehicle proximate the gate may be compared with pre-registered vehicle identification information, current location data of the vehicle proximate the gate may be compared with pre-registered destination information, current day and time information may be compared with pre-registered arrival time information, data from a RFID tag coupled to the vehicle may be compared with pre-registered RFID tag information, and/or various other data of the gate sensor event may be compared with appointment data of pre-registration information. Further, a control system may compare the data of the gate sensor event with appointment data of the pre-registration information.

The process 800 may then continue to determine whether the data of the gate sensor event matches the information for an appointment, as at 808. For example, it may be determined whether a correct, pre-registered vehicle has arrived at a correct, pre-registered destination at a correct, pre-registered day and time for a correct, pre-registered purpose or task based on the comparison. Further, a control system may determine whether the data of the gate sensor event matches or corresponds to appointment data of the pre-registration information.

If it is determined that there is not a match, the process 800 may proceed to provide information and deny entry, as at 810. There may be various reasons that entry authorization via the gate may be denied, such as a mismatched or unidentified vehicle, an incorrect destination, an incorrect day or time, an incorrect purpose or task, lack of space, personnel, or processing capacity at the facility or yard, data from a RFID tag indicating unsealed, missing, mismatched, broken, or modified status of a payload or equipment, and/or various other reasons. In addition, information or instructions may be provided to a driver of a vehicle for which entry authorization is denied, including reasons for denial, corrective or remedial actions, additional options to request authorization, and/or various other information. The information or instructions may be provided via communication systems associated with sensor systems or sensor kiosks proximate the gates, and/or via mobile or portable electronic devices and associated applications. Further, a control system may cause or instruct provision of information and denial of entry authorization.

The process 800 may further continue with transferring to manual review and authorization, as at 812. For example, responsive to denial of entry authorization based on automated processing of a gate sensor event and pre-registration information, the various data of the gate sensor event may be transmitted or provided to one or more human agents or associates to further review and potentially authorize entry for the vehicle. The manual review by human agents may identify errors in various data and/or pre-registration information, may permit exceptions to various automated processing logic, may authorize entry for various additional reasons, and/or may confirm denial of entry for the vehicle. Further, a control system may transfer the gate sensor event for manual review and authorization.

Returning to step 808, if it is determined that there is a match, the process 800 may proceed with receiving yard information, as at 814. For example, the yard information may include basic rules of yard operation, available parking locations, available dock doors, current status of various processing operations at the facility, and/or various other data associated with yard and/or facility operations. Further, a control system may receive the yard information.

The process 800 may then continue by determining a yard location based on the yard information, as at 816. For example, a yard location, such as a parking location, dock door, or other location or destination within the yard may be selected for the vehicle for which entry will be authorized. Further, a control system may select the yard location based on data of the gate sensor event, e.g., vehicle, time, purpose, and/or payload, as well as the yard information.

The process 800 may then proceed by providing instructions and authorizing entry, as at 818. For example, information or instructions may be provided to a driver of a vehicle for which entry authorization is granted, including reasons for grant, yard information or rules, selected yard location, directions or instructions to the selected yard location, further processing steps upon entry into the yard or facility, and/or various other information. The information or instructions may be provided via communication systems associated with sensor systems or sensor kiosks proximate the gates, and/or via mobile or portable electronic devices and associated applications. Further, a control system may cause or instruct provision of information and grant of entry authorization.

The process 800 may continue to instruct opening of the gate, as at 820. For example, a gate, fence, or other movable barrier may be opened, raised, removed, or otherwise modified to allow the vehicle to enter the yard of the facility via the gate. As described herein, the gate may include a wireless actuation device coupled to one or more motors or actuators of the gate, fence, or movable barrier, and instructions or commands may be transmitted to the wireless actuation device to cause opening of the gate. Further, a control system may instruct opening of the gate via communication with the wireless actuation device.

The process 800 may then end, as at 822.

Figure 9:
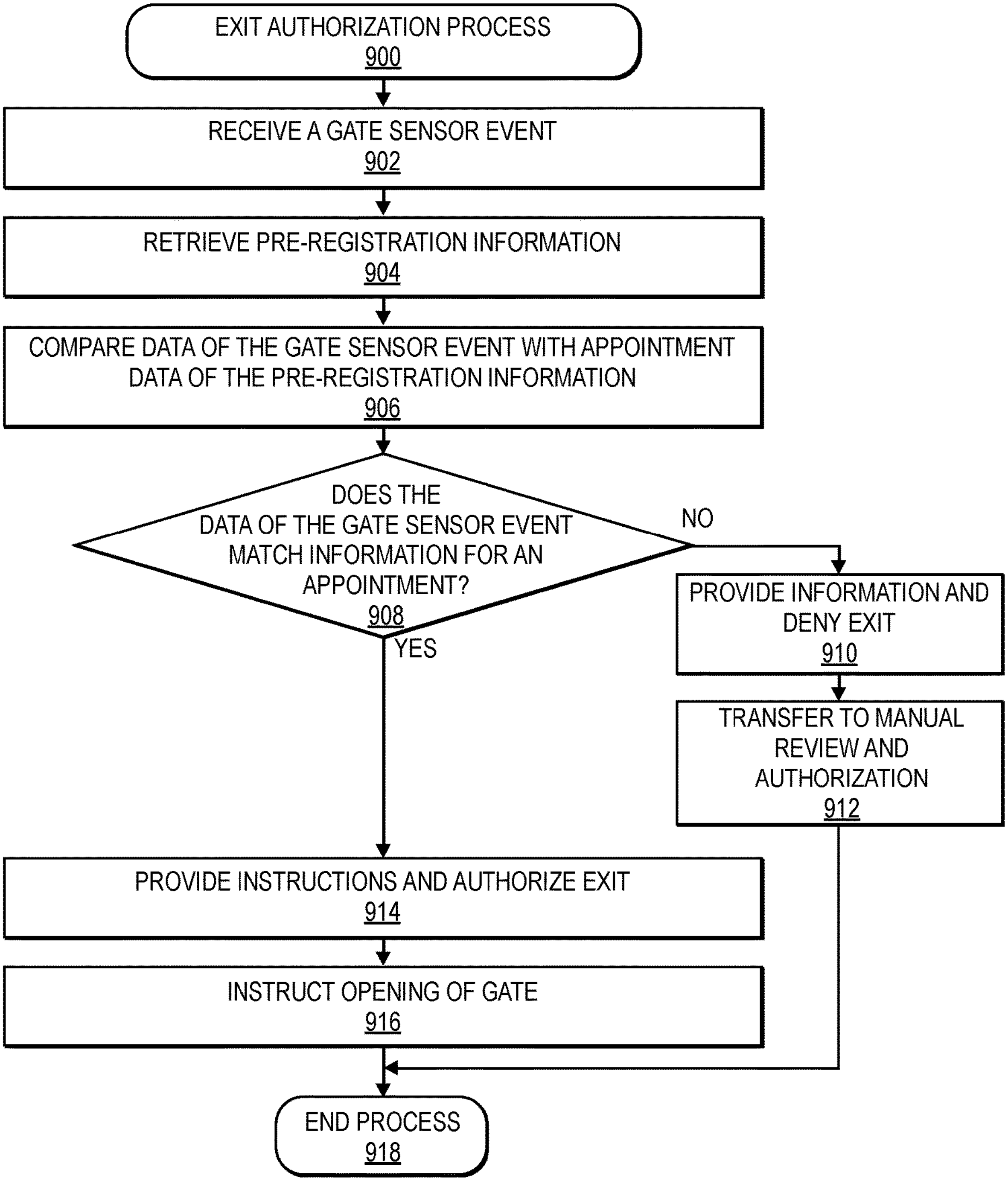
FIG. 9 is a flow diagram illustrating an example exit authorization process, in accordance with implementations of the present disclosure.

FIG. 9 is a flow diagram illustrating an example exit authorization process 900, in accordance with implementations of the present disclosure.

The process 900 may begin by receiving a gate sensor event, as at 902. For example, a gate sensor event may comprise data from various sensors that have been combined or consolidated based on a determination that a vehicle is proximate a gate of a facility and seeking access authorization. The receipt of various data and generation of a gate sensor event is described herein at least with respect to FIG. 7. Further, a control system may receive a gate sensor event.

The process 900 may continue by retrieving pre-registration information, as at 904. For example, pre-registration information may comprise appointments data related to vehicles or equipment departing from or arriving to gates of facilities. As described herein, the appointments data may comprise information related to carriers, operators, drivers, vehicles, origins, destinations, times, purpose or status, and/or other data. The pre-registration information may be stored in various data stores that may be maintained locally at one or more facilities or remotely in cloud data storage. Further, a control system may retrieve the pre-registration information.

The process 900 may proceed by comparing data of the gate sensor event with appointment data of the pre-registration information, as at 906. For example, imaging data including representations of vehicle identifiers of the vehicle proximate the gate may be compared with pre-registered vehicle identification information, current location data of the vehicle proximate the gate may be compared with pre-registered origin information, current day and time information may be compared with pre-registered departure time information, data from a RFID tag coupled to the vehicle may be compared with pre-registered RFID tag information, and/or various other data of the gate sensor event may be compared with appointment data of pre-registration information. Further, a control system may compare the data of the gate sensor event with appointment data of the pre-registration information.

The process 900 may then continue to determine whether the data of the gate sensor event matches the information for an appointment, as at 908. For example, it may be determined whether a correct, pre-registered vehicle is attempting to depart from a correct, pre-registered origin at a correct, pre-registered day and time for a correct, pre-registered purpose or task based on the comparison. Further, a control system may determine whether the data of the gate sensor event matches or corresponds to appointment data of the pre-registration information.

If it is determined that there is not a match, the process 900 may proceed to provide information and deny exit, as at 910. There may be various reasons that exit authorization via the gate may be denied, such as a mismatched or unidentified vehicle, an incorrect origin, an incorrect day or time, an incorrect purpose or task, data from a RFID tag indicating unsealed, missing, mismatched, broken, or modified status of a payload or equipment, and/or various other reasons. In addition, information or instructions may be provided to a driver of a vehicle for which exit authorization is denied, including reasons for denial, corrective or remedial actions, additional options to request authorization, and/or various other information. The information or instructions may be provided via communication systems associated with sensor systems or sensor kiosks proximate the gates, and/or via mobile or portable electronic devices and associated applications. Further, a control system may cause or instruct provision of information and denial of exit authorization.

The process 900 may further continue with transferring to manual review and authorization, as at 912. For example, responsive to denial of exit authorization based on automated processing of a gate sensor event and pre-registration information, the various data of the gate sensor event may be transmitted or provided to one or more human agents or associates to further review and potentially authorize exit for the vehicle. The manual review by human agents may identify errors in various data and/or pre-registration information, may permit exceptions to various automated processing logic, may authorize exit for various additional reasons, and/or may confirm denial of exit for the vehicle. Further, a control system may transfer the gate sensor event for manual review and authorization.

Returning to step 908, if it is determined that there is a match, the process 900 may then proceed with providing instructions and authorizing exit, as at 914. For example, information or instructions may be provided to a driver of a vehicle for which exit authorization is granted, including reasons for grant, directions or instructions for exiting the yard or facility, further processing steps upon exit from the facility, bills of lading, schedules or confirmations of upcoming appointments, and/or various other information. The information or instructions may be provided via communication systems associated with sensor systems or sensor kiosks proximate the gates, and/or via mobile or portable electronic devices and associated applications. Further, a control system may cause or instruct provision of information and grant of exit authorization.

The process 900 may continue to instruct opening of the gate, as at 916. For example, a gate, fence, or other movable barrier may be opened, raised, removed, or otherwise modified to allow the vehicle to exit the yard of the facility via the gate. As described herein, the gate may include a wireless actuation device coupled to one or more motors or actuators of the gate, fence, or movable barrier, and instructions or commands may be transmitted to the wireless actuation device to cause opening of the gate. Further, a control system may instruct opening of the gate via communication with the wireless actuation device.

The process 900 may then end, as at 918.

FIG. 10 is a block diagram illustrating various components of an example control system 1000, in accordance with implementations of the present disclosure.

Various operations of a control system or controller, such as those described herein, may be executed on one or more computer systems, and/or interacting with various other computers, systems, or devices in or proximate a material handling facility, according to various implementations. For example, the control system or controller discussed above may function and operate on one or more computer systems. One such control system is illustrated by the block diagram in FIG. 10. In the illustrated implementation, a control system 1000 includes one or more processors 1010A, 1010B through 1010N, coupled to a non-transitory computer-readable storage medium 1020 via an input/output (I/O) interface 1030. The control system 1000 further includes a network interface 1040 coupled to the I/O interface 1030, and one or more input/output devices 1050. In some implementations, it is contemplated that a described implementation may be implemented using a single instance of the control system 1000 while, in other implementations, multiple such systems or multiple nodes making up the control system 1000 may be configured to host different portions or instances of the described implementations. For example, in one implementation, some data sources or services (e.g., related to portions of automated entry/exit authorization systems, operations, or processes, etc.) may be implemented via one or more nodes of the control system 1000 that are distinct from those nodes implementing other data sources or services (e.g., related to other portions of automated entry/exit authorization systems, operations, or processes, etc.).

In various implementations, the control system 1000 may be a uniprocessor system including one processor 1010A, or a multiprocessor system including several processors 1010A-1010N (e.g., two, four, eight, or another suitable number). The processors 1010A-1010N may be any suitable processor capable of executing instructions. For example, in various implementations, the processors 1010A-1010N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010A-1010N may commonly, but not necessarily, implement the same ISA.

The non-transitory computer-readable storage medium 1020 may be configured to store executable instructions and/or data accessible by the one or more processors 1010A-1010N. In various implementations, the non-transitory computer-readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1020 as program instructions 1025 and data storage 1035, respectively. In other implementations, program instructions and/or data may be received, sent or stored upon different types of computer-accessible media, such as non-transitory media, or on similar media separate from the non-transitory computer-readable storage medium 1020 or the control system 1000. Generally speaking, a non-transitory, computer-readable storage medium may include storage media or memory media such as magnetic or optical media, e.g., disk or CD/DVD-ROM, coupled to the control system 1000 via the I/O interface 1030. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1040.

In one implementation, the I/O interface 1030 may be configured to coordinate I/O traffic between the processors 1010A-1010N, the non-transitory computer-readable storage medium 1020, and any peripheral devices, including the network interface 1040 or other peripheral interfaces, such as input/output devices 1050. In some implementations, the I/O interface 1030 may perform any necessary protocol, timing or other data transformations to convert data signals from one component (e.g., non-transitory computer-readable storage medium 1020) into a format suitable for use by another component (e.g., processors 1010A-1010N). In some implementations, the I/O interface 1030 may include support for devices attached through various types of peripheral buses, such as a variant of the Peripheral Component Interconnect (PCI) bus standard or the Universal Serial Bus (USB) standard, for example. In some implementations, the function of the I/O interface 1030 may be split into two or more separate components, such as a north bridge and a south bridge, for example. Also, in some implementations, some or all of the functionality of the I/O interface 1030, such as an interface to the non-transitory computer-readable storage medium 1020, may be incorporated directly into the processors 1010A-1010N.

The control system 1000 may also include a data collection subsystem 1032 that may be configured to receive, process, store, aggregate, and/or transmit data captured by the various sensors and associated gate sensor events. In addition, the control system 1000 may also include an automated gate logic subsystem 1034 that may be configured to perform the various processing steps described herein, including equipment or vehicle identification based on gate sensor events, identification, comparison, and validation of appointments from pre-registration information based on the gate sensor events, determinations of security or chain of custody related to payloads, determinations related to granting or denying access, and/or communications of instructions and information to vehicles and drivers. Further, the control system 1000 may also include an automated gate actuation subsystem 1036 that may be configured to communicate with wireless actuation devices associated with gates to automatically cause opening or closing of the gates. Moreover, the control system 1000 may include an information communication subsystem 1038 that may be configured generate and transmit information or instructions to various communication systems associated with gates and/or portable electronic devices associated with vehicles or drivers.

The network interface 1040 may be configured to allow data to be exchanged between the control system 1000 and other devices attached to a network, such as other control systems, material handling system controllers, warehouse, facility, yard, and/or gate management systems, other computer systems, various types of sensor systems, or between nodes of the control system 1000. In various implementations, the network interface 1040 may support communication via wired or wireless general data networks, such as any suitable type of Ethernet network.

Input/output devices 1050 may, in some implementations, include one or more displays, screens, monitors, projection devices, cameras, imaging devices or sensors, other visual input/output devices, microphones, speakers, other audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1000. Multiple input/output devices 1050 may be present in the control system 1000 or may be distributed on various nodes of the control system 1000. In some implementations, similar input/output devices may be separate from the control system 1000 and may interact with one or more nodes of the control system 1000 through a wired or wireless connection, such as over the network interface 1040.

As shown in FIG. 10, the memory 1020 may include program instructions 1025 that may be configured to implement one or more of the described implementations and/or provide data storage 1035, which may comprise various tables, data stores and/or other data structures accessible by the program instructions 1025. The program instructions 1025 may include various executable instructions, programs, or applications to facilitate automated entry/exit authorization operations and processes described herein, such as sensor data collection and aggregation controllers, drivers, or applications, pre-registration information aggregation controllers, drivers, or applications, automated gate sensor event processing controllers, drivers, or applications, automated gate actuation controllers, drivers, or applications, automated gate information communication controllers, drivers, or applications, etc. The data storage 1035 may include various data stores for maintaining data related to systems, operations, or processes described herein, such as various sensor systems or sensor kiosks, sensor data, gate sensor events, pre-registration information, appointments data, yard or facility information, driver information or instructions, gate actuators, etc.

Those skilled in the art will appreciate that the control system 1000 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 6-9, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An automated entry or exit system associated with a facility, comprising:
- a gate comprising a motor;
- a forward sensor system comprising a forward imaging device;
- a presence sensor system comprising a motion sensor;
- a rearward sensor system comprising a rearward imaging device and a radiofrequency identification (RFID) reader;
- a communication system comprising a display, a microphone, and a speaker; and
- a control system configured to at least:
  - receive, from the motion sensor, data indicating presence of a tractor and a trailer proximate the gate at a first time;
  - receive, from the forward imaging device, first imaging data of a first license plate associated with the tractor;
  - receive, from the rearward imaging device, second imaging data of a second license plate associated with the trailer;
  - receive, from the RFID reader, data associated with an identifier and a status of a RFID tag coupled to a latch of the trailer;
  - receive pre-registration information associated with the tractor and the trailer;
  - compare the pre-registration information with the first imaging data, the second imaging data, the data of the RFID tag, and the first time;
  - determine a match between the pre-registration information and the first imaging data, the second imaging data, the data of the RFID tag, and the first time;
  - provide, via the communication system, instructions for the tractor and the trailer; and
  - instruct operation of the gate based on the determined match.

2. The automated entry or exit system of claim 1, wherein the communication system is associated with at least one of the forward sensor system, the presence sensor system, or a portable electronic device.

3. The automated entry or exit system of claim 1, wherein the motor of the gate is automatically instructed by the control system responsive to the determined match.

4. The automated entry or exit system of claim 1, wherein the RFID tag is coupled to the latch that secures a door of the trailer.

5. The automated entry or exit system of claim 1, wherein the presence detection system further comprises a global positioning system (GPS) receiver configured to receive GPS data from a GPS device onboard the tractor and the trailer; and
- wherein the control system is further configured to at least:
  - receive, from the GPS receiver, GPS data from the GPS device indicating presence of the tractor and the trailer proximate the gate at the first time.

6. A system, comprising:
- a gate;
- a forward sensor system comprising a forward imaging device;
- a rearward sensor system comprising a rearward imaging device and a radiofrequency identification (RFID) reader; and
- a control system configured to at least:
  - receive, from the forward imaging device and the rearward imaging device, imaging data of an identifier associated with a vehicle proximate the gate at a first time, wherein the vehicle comprises a tractor and a trailer, the identifier associated with the vehicle comprises at least one of a license plate or a commercial vehicle identification number, the forward imaging device is configured to capture first imaging data of a first license plate or a first commercial vehicle identification number associated with at least one of a front or a lateral side of the tractor, and the rearward imaging device is configured to capture second imaging data of a second license plate or a second commercial vehicle identification number associated with the trailer;
  - receive, from the RFID reader, data associated with a RFID tag coupled to a latch associated with the vehicle;
  - generate a gate sensor event based on the imaging data, the data of the RFID tag, and the first time;
  - receive pre-registration information associated with the vehicle;
  - compare the pre-registration information with the gate sensor event;
  - determine whether the pre-registration information matches the gate sensor event; and
  - responsive to determining a match between the pre-registration information and the gate sensor event: instruct operation of the gate.

7. The system of claim 6, further comprising:
- a presence sensor system comprising a motion sensor and a global positioning system (GPS) receiver; and
- wherein the control system is further configured to at least one of:
  - receive, from the motion sensor, data indicating presence of the vehicle proximate the gate at the first time; or
  - receive, from the GPS receiver, GPS data from a GPS device onboard the vehicle indicating presence of the vehicle proximate the gate at the first time.

8. The system of claim 6, wherein the RFID tag is coupled to the latch that secures a door of the vehicle; and
- wherein the data associated with the RFID tag comprises at least one of an identifier or a status.

9. The system of claim 8, wherein the identifier is received from a first circuit associated with a body of the RFID tag, the identifier comprising a unique identifier of the RFID tag; and
- wherein the status is received from a second circuit associated with a loop of the RFID tag, the status comprising at least one of closed, intact, open, or broken.

10. The system of claim 6, wherein the pre-registration information associated with the vehicle includes appointment data comprising at least one of vehicle identification, payload information, origin information, destination information, or time information; and
- wherein determining the match between the pre-registration information and the gate sensor event further comprises at least one of:

determining that the imaging data of the identifier associated with the vehicle matches the vehicle identification of the appointment data;

determining that a location of the vehicle proximate the gate matches the origin information or the destination information of the appointment data; or determining that the first time matches the time information of the appointment data.

11. The system of claim 6, further comprising:

a communication system comprising a display, a microphone, and a speaker; and wherein the control system is further configured to:

responsive to determining the match between the pre-registration information and the gate sensor event:

provide instructions to the vehicle via the communication system.

12. The system of claim 11, wherein the control system is further configured to:

responsive to determining the match between the pre-registration information and the gate sensor event:

receive information associated with a facility and a yard associated with the gate; and determine a yard location associated with the yard and the facility, the yard location comprising at least one of a dock door or a parking location of the facility;

wherein the instructions provided to the vehicle include the yard location.

13. The system of claim 11, wherein the control system is further configured to:

responsive to determining a discrepancy between the pre-registration information and the gate sensor event, at least one of:

transfer the gate sensor event and the pre-registration information to an agent for manual review; or provide information to the vehicle that access is denied.

14. The system of claim 6, wherein the gate comprises a motor; and wherein the control system is further configured to:

instruct operation of the gate via communication with the motor.

15. A method, comprising:

receiving, by a control system from a forward imaging device and a rearward imaging device, imaging data of an identifier associated with a vehicle proximate a gate of a facility at a first time, wherein the vehicle comprises a tractor and a trailer, the identifier associated with the vehicle comprises at least one of a license plate or a commercial vehicle identification number, the forward imaging device is configured to capture first imaging data of a first license plate or a first commercial vehicle identification number associated with at least one of a front or a lateral side of the tractor, and the rearward imaging device is configured to capture second imaging data of a second license plate or a second commercial vehicle identification number associated with the trailer;

receiving, by the control system from a RFID reader, data associated with a RFID tag coupled to a latch associated with the vehicle;

generating, by the control system, a gate sensor event based on the imaging data, the data of the RFID tag, and the first time;

receiving, by the control system, pre-registration information associated with the vehicle;

comparing, by the control system, the pre-registration information with the gate sensor event;

determining, by the control system, whether the pre-registration information matches the gate sensor event; and responsive to determining a match between the pre-registration information and the gate sensor event:

instructing, by the control system, operation of the gate.

16. The method of claim 15, further comprising at least one of:

receiving, by the control system from a motion sensor, data indicating presence of the vehicle proximate the gate of the facility at the first time; or receiving, by the control system from a GPS receiver, GPS data from a GPS device onboard the vehicle indicating presence of the vehicle proximate the gate of the facility at the first time.

17. The method of claim 15, further comprising:

responsive to determining the match between the pre-registration information and the gate sensor event:

providing, by the control system via a communication system proximate the gate, instructions to the vehicle.

18. The method of claim 15, wherein the control system instructs operation of the gate via communication with a motor associated with the gate.

* * * * *